United States Patent
Wang et al.

(10) Patent No.: US 9,059,797 B2
(45) Date of Patent: Jun. 16, 2015

(54) METHOD, APPARATUS AND UNIT FOR DETECTING FAULT OF SUBMARINE DEVICE

(75) Inventors: Guozhong Wang, Beijing (CN); Xiaoyan Fan, Beijing (CN); Kai Sun, Beijing (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 582 days.

(21) Appl. No.: 13/406,160

(22) Filed: Feb. 27, 2012

(65) Prior Publication Data
US 2012/0155857 A1    Jun. 21, 2012

Related U.S. Application Data

(63) Continuation of application No. PCT/CN2010/076328, filed on Aug. 25, 2010.

(30) Foreign Application Priority Data

Aug. 27, 2009   (CN) .......................... 2009 1 0171248

(51) Int. Cl.
*H04B 10/08* (2006.01)
*H04B 10/077* (2013.01)

(52) U.S. Cl.
CPC .................................. *H04B 10/0771* (2013.01)

(58) Field of Classification Search
CPC ...... H04B 10/03; H04B 10/035; H04B 10/07; H04B 10/071; H04B 10/0731; H04B 10/0773; H04B 10/0771; H04B 10/073; H04B 10/077; H04B 10/0775; H04B 10/0777
USPC ......... 398/167, 165, 169, 170, 141, 9, 10, 17, 398/33
See application file for complete search history.

(56) References Cited

U.S. PATENT DOCUMENTS

| | | | | |
|---|---|---|---|---|
| 4,302,835 A | * | 11/1981 | McMahon | .................... 370/445 |
| 5,517,383 A | | 5/1996 | Webb | |
| 5,825,515 A | | 10/1998 | Anderson | |
| 2004/0208503 A1 | | 10/2004 | Shieh | |

FOREIGN PATENT DOCUMENTS

| | | |
|---|---|---|
| CN | 1556384 A | 12/2004 |
| CN | 1265183 C | 7/2006 |
| CN | 101242224 A | 8/2008 |
| CN | 101453266 A | 6/2009 |
| EP | 1 294 111 A2 * | 3/2003 ............. H04B 10/08 |

OTHER PUBLICATIONS

Supplementary European Search Report dated Jul. 2, 2013 in connection with European Patent Application No. EP 10 81 1264.
Written Opinion of the International Searching Authority dated Dec. 9, 2010 in connection with International Patent Application No. PCT/CN2010/076328.
Lei Zhang, et al., "Fast detection of humidity with a subwavelength-diameter fiber taper coated with gelatin film", Optics Express, vol. 16, No. 17, Aug. 14, 2008, 5 pages.
X.F. Huang, et al., "Low-cost relative humidity sensor based on thermoplastic polyimide-coated fiber Bragg grating", ScienceDirect, 2007, p. 518-524.
International Search Report dated Dec. 9, 2010 in connection with International Patent Application No. PCT/CN2010/076328.

* cited by examiner

*Primary Examiner* — M. R. Sedighian

(57) ABSTRACT

The embodiments of the present invention relate to optical communication technologies, and provide a method, an apparatus, and a unit for detecting a fault of a submarine device. The apparatus includes: a pair of optical couplers that are respectively set on two optical cables for transmitting optical signals in opposite direction and are configured to receive or send optical detection signals through the optical cables, where: the two optical couplers are connected through an optical fiber that transmits an optical detection signal, and a photosensitive component is set on the optical fiber and is configured to adjust an optical parameter of the optical detection signal by perceiving change of an ambient environment state parameter when a fault occurs. The embodiments of the present invention bring benefits of detecting whether a target submarine device is faulty, and locating a cause for the fault of the submarine device accurately.

6 Claims, 5 Drawing Sheets

US 9,059,797 B2

METHOD, APPARATUS AND UNIT FOR DETECTING FAULT OF SUBMARINE DEVICE

CROSS-REFERENCE TO RELATED APPLICATIONS

This application is a continuation of International Application No. PCT/CN2010/076328, filed on Aug. 25, 2010, which claims priority to Chinese Patent Application No. 200910171248.3, filed on Aug. 27, 2009, both of which are hereby incorporated by reference in their entireties.

TECHNICAL FIELD

The present invention relates to the field of optical communications technologies, and in particular, to a method, an apparatus, and a unit for detecting a fault of a submarine device.

BACKGROUND

With rapid development of communication technologies across the globe, security and reliability of submarine transmission devices are very important to relevant vendors of different countries such as communication equipment manufacturers and equipment suppliers. Once such equipment fails, not only the normal communication will be affected, but also the maintenance cost will be very high. By taking the Internet communication for example, the Internet that links the world is transmitting huge amounts of communication information at every second. Such communication information is conveyed by onshore devices and submarine devices. Onshore devices pack and transmit the communication information, and submarine devices process, send, and receive communication signals including such information. Submarine devices mainly include Submarine Optical Fiber Cable (SOFC), submarine repeater (RPT), and submarine optical Branching Unit (BU). For example, the BU is an optical signal branching unit that combines parts of optical signals or lightwaves of a main optical path or splits the optical signals or lightwaves of the main optical path into branches. When the SOFC on the main optical path needs to be cut off due to a fault or maintenance, other BU parts can ensure that the branches are powered normally, so as to minimize the impact caused by a fault on the transmission signals of the SOFC. Therefore, when a submarine cable system introduces the BU, the function of mutual communication between multiple sites can be implemented, and the usage number of SOFCs can be reduced. The BU is of high practical value.

In the process of developing the present invention, the inventor finds the prior art has at least the following defects: Once a submarine device fails, the normal communication of the Internet is surely affected. Therefore, it becomes very important to locate a fault quickly and determine fault causes. For the fault of the submarine device, mostly a fault is caused by water penetration in such devices or burnout of lines. Such a fault may lead to the failure of the device function, make a certain optical fiber lose the capability of transmitting signals, and definitely bring incontinence to the normal communication. How to effectively detect a fault of a submarine device is a problem that persons skilled in the art expect to solve for a long time.

SUMMARY

Embodiments of the present invention provide a method, an apparatus, and a device for detecting a fault of a submarine device efficiently. The method and apparatus, which is set in a submarine device, for detecting the fault of the submarine device may change an optical parameter in an optical signal according to the change of the environment state in the submarine device, and therefore as long as whether the change of a corresponding optical parameter in the optical signal is detected, whether the environment state in the submarine device has changed is acquired, and whether any fault occurs is judged.

To fulfill the foregoing invention objectives, an embodiment of the present invention provides a method for detecting a fault of a submarine device, including:

receiving an input optical detection signal, and transmitting the optical detection signal to an input optical detection signal side along a preset loop; and changing an optical parameter of the optical detection signal transmitted to the input optical detection signal side according to change of an ambient environment state parameter when a fault occurs, so that the input optical detection signal side judges the fault occurs according to change of the optical parameter of the optical detection signal.

To fulfill the foregoing invention objectives, an embodiment of the present invention provides an apparatus for detecting a fault of a submarine device. The apparatus includes a pair of optical couplers that are respectively set on two optical cables for transmitting optical signals in opposite direction and are configured to receive or send optical detection signals through the optical cables, where:

the two optical couplers are connected through an optical fiber that transmits an optical detection signal; and a transmissive optical component is set on the optical fiber, and is configured to adjust an optical parameter of the optical detection signal by perceiving change of an ambient environment state parameter when a fault occurs.

To fulfill the foregoing invention objectives, an embodiment of the present invention provides a submarine optical branching unit. The submarine optical branching unit includes an apparatus for detecting a fault of a submarine device, and the apparatus further includes:

a pair of optical couplers that are respectively set on two optical cables for transmitting optical signals in opposite direction and are configured to receive or send optical detection signals through the optical cables, where:

the two optical couplers are connected through an optical fiber that transmits an optical detection signal; and a transmissive optical component is set on the optical fiber, and is configured to adjust an optical parameter of the optical detection signal by perceiving change of an ambient environment state parameter when a fault occurs.

To fulfill the foregoing invention objectives, an embodiment of the present invention provides an apparatus for detecting a fault of a submarine device, including:

a pair of optical couplers that are respectively set on two optical cables for transmitting optical signals in opposite direction and are configured to receive or send optical detection signals through the optical cables, where:

the two optical couplers are connected through an optical fiber that transmits an optical detection signal; and a reflective optical component connected with an output port of an optical coupler and configured to adjust an optical parameter of the optical detection signal by perceiving change of an ambient environment state parameter when a fault occurs, and reflect, to the optical fiber, the optical detection signal with the optical parameter adjusted.

To fulfill the foregoing invention objectives, an embodiment of the present invention provides a submarine optical branching unit. The submarine optical branching unit includes an apparatus for detecting a fault of a submarine device, and the apparatus further includes:

a pair of optical couplers that are respectively set on two optical cables for transmitting optical signals in opposite direction and are configured to receive or send optical detection signals through the optical cables, where:

the two optical couplers are connected through an optical fiber that transmits an optical detection signal; and a reflective optical component connected with an output port of an optical coupler and configured to adjust an optical parameter of the optical detection signal by perceiving change of an ambient environment state parameter when a fault occurs, and reflect, to the optical fiber, the optical detection signal of the optical parameter adjusted. The benefits of the embodiments of the present invention lie in that: whether a fault occurs in a target submarine device is detected, so as to provide a means of accurately locating a cause for the fault of the submarine device.

BRIEF DESCRIPTION OF THE DRAWINGS

To describe the technical solutions of embodiments of the present invention more clearly, the following outlines the accompanying drawings for describing the embodiments of the present invention. Apparently, the accompanying drawings described below are merely about some embodiments of the present invention, and persons of ordinary skill in the art can derive other drawings from the accompanying drawings without any creative effort.

DETAILED DESCRIPTION

The technical solutions of the embodiments of the present invention are described clearly and comprehensively with reference to the accompanying drawings in the embodiments of the present invention. Evidently, the embodiments to be described are merely some rather than all embodiments of the present invention. All other embodiments derived by those skilled in the art from the embodiments of the present invention without any creative effort shall fall within the protection scope of the present invention.

The embodiments of the present invention are a technology for detecting a water penetration fault of a submarine communication device. The technology mainly detects whether an optical parameter in an optical detection signal that pass through a submarine communication device changes. If any change is detected, it indicates that a phenomenon that water has penetrated into a corresponding submarine communication device exists. If a fault has occurred on the communication device, the fault is probably caused by the water penetration in the device, thereby providing an effective basis for judging a cause for a fault of the submarine communication device.

The exemplary embodiments of the present invention and the description of the embodiments are for explaining the present invention, and shall not be construed as limitation on the present invention.

Embodiment 1

Figure 1:
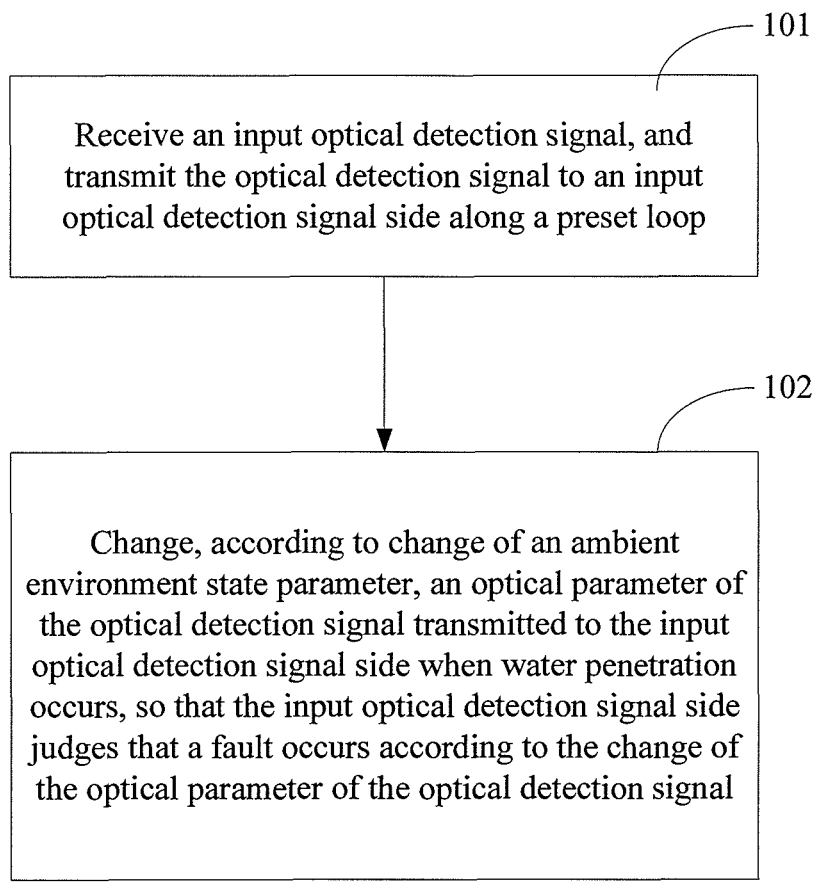
FIG. 1 is a flowchart of a method for detecting a water penetration fault of a submarine communication device according to Embodiment 1 of the present invention.

The embodiment of the present invention provides a method for detecting a water penetration fault of a submarine communication device. FIG. 1 is a flowchart of the embodiment of the present invention. As shown in FIG. 1, the method for detecting the water penetration fault of the submarine communication device in the embodiment includes the following steps:

101. An input optical detection signal is received, and the optical detection signal is transmitted to an input optical detection signal side along a preset loop.

102. An optical parameter of the optical detection signal, which is transmitted to the input optical detection signal side, is changed according to change of an ambient environment state parameter when a fault occurs, so that the input optical detection signal side judges that the fault occurs according to the change of the optical parameter of the optical detection signal.

A submarine optical cable is mainly used for transmitting an optical service signal, and the optical service signal surely passes through other submarine communication device such as a submarine repeater or a submarine optical branching unit. Therefore, an apparatus for detecting a water penetration fault of a submarine communication device is set in a submarine communication device like a submarine repeater or a submarine optical branching unit. The apparatus may receive an optical detection signal sent by an onshore device through a submarine optical cable according to step 101, and transmit the optical detection signal back to the onshore device along a preset loop. The preset loop is an optical fiber path that is preset for returning a received optical detection signal back to the onshore device. For example, the preset loop is an optical fiber that is in the apparatus for detecting the water penetration fault of the submarine communication device and connects a receiving end to a sending end, where the receiving end receives the optical detection signal sent by the onshore device and the sending end sends the optical detection signal to the onshore device. The optical detection signal may be transmitted through the optical fiber from the receiving end to the sending end. The sending end may be connected to a submarine optical cable that is used to transmit an optical service signal sent in other direction to the onshore device. Therefore, the optical detection signal may be returned to the onshore device along the preset loop. In step 102, when water penetrates into the submarine communication device, the optical parameter of the optical detection signal transmitted to the input optical detection signal side are changed according to the change of the ambient environment state parameter in the device. For example, when water penetrates into the device, humidity in the device is higher than normal. Therefore, when the humidity in the device changes, the humidity-sensitive photosensitive material in the apparatus may change, and the change of the photosensitive material leads to change of the optical refractive index on the material. When the optical detection signal passes through the photosensitive material, the optical parameters, such as optical power and wavelength, of the optical detection signal also change. The photosensitive material may be a tapered optical fiber coated with gelatin, where the tapered optical fiber has a sub-wavelength diameter. The optical fiber is set in a span of an optical fiber path. The optical fiber is very sensitive to change of humidity. Once ambient humidity changes, a refractive index of the optical fiber changes, and parameters, such as optical power and wavelength, of the optical detection signal that passes through the span of the optical fiber path also change. In the way, the optical parameter of the optical detection signal transmitted to the input optical detection signal side is different from the optical parameter existent at the time of receiving the optical detection signal. In the embodiment, the optical detection signal is sent from the onshore device, and is returned to the onshore device along the preset loop described in step 101. The onshore device judges whether the optical parameter of the returned optical detection signal changes, for example, whether optical power or optical wavelength changes. If any optical parameter changes, it indicates that humidity in a corresponding submarine communication device is huge, and the water penetration fault may exist. If water penetration is detected in the submarine communication device when a fault occurs, it indicates that the fault of the corresponding device is probably caused by the water penetration, and the water penetration needs to be handled in time.

Similarly, if no water penetration occurs, the optical parameter of the optical detection signal do not change, and, if the onshore device judges that the optical parameter of the received optical detection signal does not change, it indicates that no water penetration occurs in the corresponding submarine communication device.

It should be noted that the ambient environment state parameter in the embodiment may not only be an ambient environment state humidity parameter, but also be an environment state temperature parameter or an environment state pressure parameter. That is, a transmissive material sensitive to change of temperature or pressure may be applied, so that the refractive index of the transmissive material changes when the transmissive material perceives change of ambient temperature or pressure. Therefore, in step 102, a proper photosensitive material may be selected according to an actual condition to accomplish a corresponding technical effect. For example, if a circuit of a submarine device burns out, the refractive index of the transmissive material changes when the transmissive material perceives the change of the ambient temperature. According to a material feature of the transmissive material that is a type of material sensitive to the change of the ambient temperature, that is, according to the optical detection signal with the changed optical parameter, it may be judged that temperature in the submarine communication device rises and a fault that circuit burns out occurs.

The benefits of the embodiment of the present invention lie in that: through the method described in the embodiment of the present invention, whether a target submarine communication device is faulty can be detected, and the cause for the fault of the submarine communication device can be found out accurately.

Embodiment 2

Figure 2:
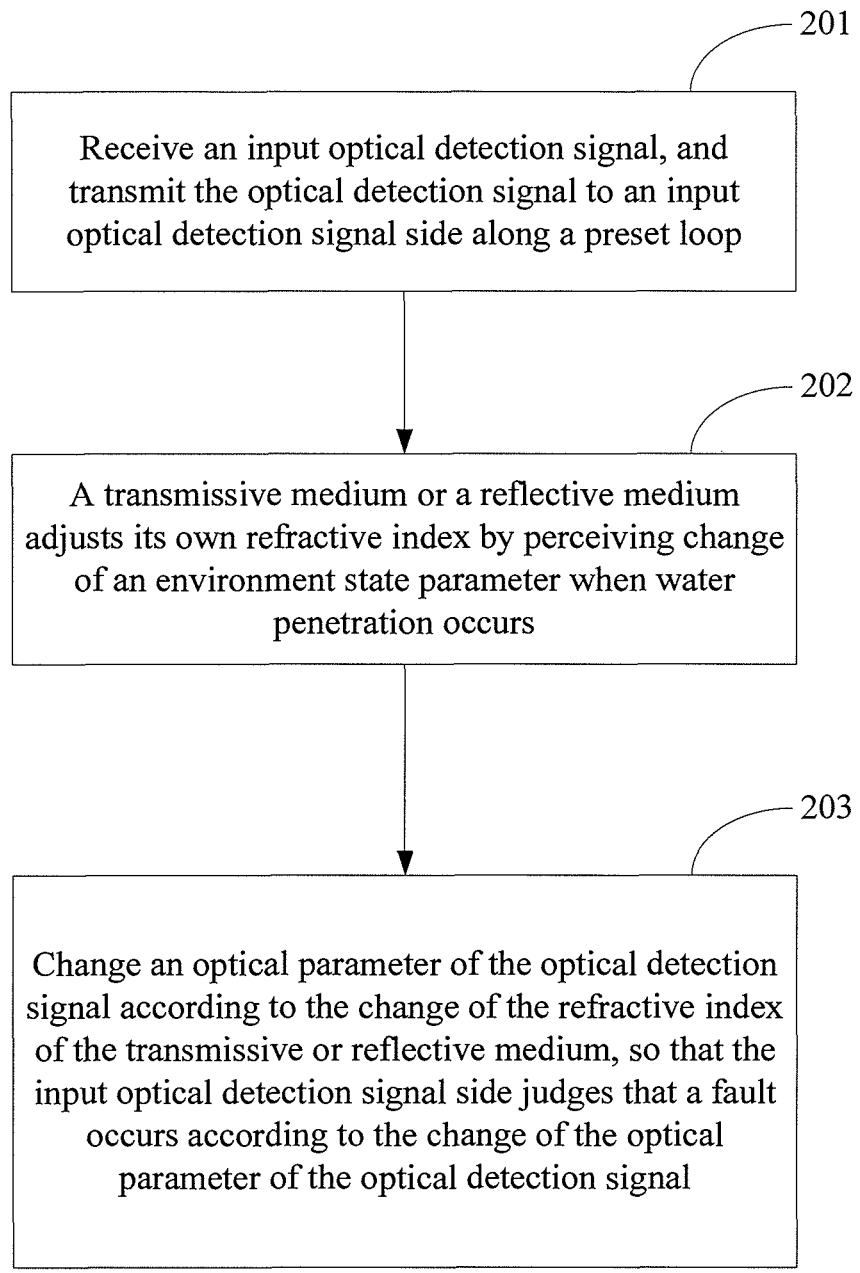
FIG. 2 is a flowchart of a method for detecting a water penetration fault of a submarine communication device according to Embodiment 2 of the present invention.

The embodiment of the present invention provides a method for detecting a water penetration fault of a submarine communication device. An apparatus for detecting a water penetration fault of a submarine communication device is taken as an example. FIG. 2 is a flowchart of the embodiment of the present invention. As shown in FIG. 2, the method for detecting the water penetration fault of the submarine communication device in the embodiment includes the following steps:

201. An input optical detection signal is received, and the optical detection signal is transmitted to an input optical detection signal side along a preset loop.

The step is the same as step 101 in Embodiment 1, and is not repeated any further.

202. A transmissive optical component used for transmitting the optical detection signal or a reflective optical component used for reflecting the optical detection signal adjusts its own refractive index by perceiving change of an ambient environment state parameter when the water penetration fault occurs.

The transmissive optical component or the reflective optical component may be set in the apparatus for detecting the water penetration fault in the embodiment. The transmissive optical component and the reflective optical component each may adjust its own refractive index by perceiving change of the ambient environment state parameter. The transmissive optical component or the reflective optical component in the embodiment is an optical component that is sensitive to change of an environment state (such as humidity, temperature, or pressure). A refractive index of media changes once the humidity, temperature or pressure in an ambient environment changes. A humidity-sensitive transmissive optical component is taken as an example, and the type of transmissive optical component may be a tapered optical fiber coated with gelatin, where the tapered optical fiber has a sub-wavelength diameter. The optical fiber may be set in a span of a preset optical fiber path so that the optical detection signal surely passes through the span of the tapered optical fiber when the optical detection signal is returned to the input optical detection signal side.

203. The optical parameter of the optical detection signal is changed accordingly when the refractive index of the transmissive optical component or the reflective optical component is changed, so that the input optical detection signal side judges that the fault occurs according to the change of the optical parameter of the optical detection signal.

Here, since the optical detection signal is transmitted through the transmissive optical component or is reflected by the reflective optical component, the optical parameter of the optical detection signal, such as optical power or optical wavelength, is changed. The optical detection signal with the changed optical parameter is transmitted to the input optical detection signal side along a preset loop. For example, the optical detection signal with the changed optical parameter is transmitted, through another submarine optical cable in the preset loop, to the input optical detection signal side, such as an onshore device of the input optical detection signal, so that, after receiving the optical detection signal, the onshore device judges whether the optical parameter of the optical detection signal is changed. If a judging result is that the optical parameter is changed, it can be acquired that the environment state in the submarine communication device is changed, that is, humidity or pressure in the device is changed. The change is probably caused by water penetration in the device, and it is concluded that the water penetration fault occurs in the device.

Similarly, if no water penetration occurs, the optical parameter of the optical detection signal does not change, and therefore, when the onshore device judges that the optical parameter of the received optical detection signal does not change, it indicates that no water penetration fault occurs in a corresponding submarine communication device.

It should be noted that the ambient environment state parameter in the embodiment may not only be an ambient environment state humidity parameter, but also be an environment state temperature parameter or an environment state pressure parameter. That is, a transmissive optical component or a reflective optical component sensitive to change of temperature or pressure may be applied, so that the refractive index of the transmissive optical component or the reflective optical component changes when the transmissive optical component or reflective optical component perceives change of ambient temperature or pressure. Therefore, in step 202, a proper transmissive optical component or reflective optical component may be selected according to an actual condition to accomplish a corresponding technical effect. For example, if a circuit of a submarine device burns out, the refractive index of the transmissive optical component or the reflective optical component changes when the transmissive optical component or reflective optical component perceives the change of the ambient temperature. According to a material feature of the transmissive optical component or the reflective optical component that is a type of material sensitive to the change of the ambient temperature, that is, according to the optical detection signal with the changed optical parameter, it may be judged that temperature in the submarine communication device rises and a fault that circuit burns out occurs.

The benefits of the embodiment of the present invention lie in that: Proper media sensitive to the change of the environment state are selected to adjust the optical parameter of the optical detection signal; whether a fault occurs in the corresponding submarine communication device is judged according to specific media and the optical detection signal with the changed optical parameter. If a fault occurs, it can be learned the cause for the fault of the submarine communication device, thereby locating the fault of the submarine communication device more conveniently, finding out the location of the fault in time, and providing an effective method for the maintenance of the submarine communication device.

In the method embodiment above, the preset loop is used to return the received optical detection signal back to the input optical detection signal side, so that the input optical detection signal side judges whether the optical parameter of the optical detection signal is changed and then judges whether a fault occurs. The description about the preset loop in the preceding embodiment is exemplary. Persons skilled in the art can definitely design other loops with the same function according to the foregoing description. Therefore, the foregoing description about the preset loop shall not be construed as the only implementation, and shall not be construed as limitation on the present invention, and designs of other loops with the same function shall fall within the protection scope of the present invention.

Embodiment 3

Figure 3:
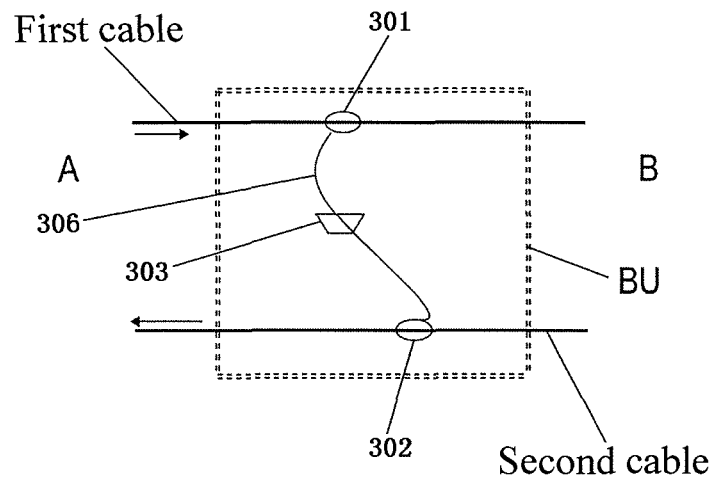
FIG. 3 is a schematic diagram of an apparatus for detecting a water penetration fault of a submarine communication device according to Embodiment 3 of the present invention.

To better implement the method in the foregoing embodiment, the embodiment provides an apparatus for detecting a water penetration fault of a submarine communication device. A submarine optical branching unit (that is, BU) used as a submarine communication device is taken as an example. As shown in FIG. 3, FIG. 3 is a schematic structure diagram of the apparatus for detecting the water penetration fault of the submarine optical branching unit.

The BU is a submarine optical branching unit, and splits and combines multiple submarine optical cables. Therefore, once water penetrates into the BU, the optical fiber will fail in transmitting the optical service signals normally, and the global Internet service will be disrupted. As a result, it is essential to detect the BU.

Figure 4:
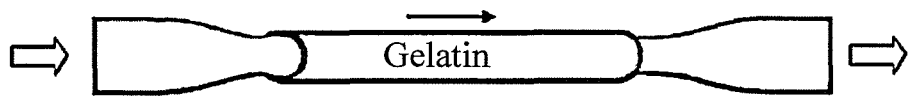
FIG. 4 is a schematic structure diagram of a transmissive sensor shown in FIG. 3.

In FIG. 3, two unidirectional transmission submarine optical cables run through the BU, and are both connected to landing station A and landing station B onshore. A transmission direction in which one of the two submarine optical cables transmits a signal is opposite to a transmission direction in which the other of the two submarine optical cables transmits a signal. That is, one optical cable is a first optical cable that transmits a signal from landing station A to landing station B, and the other optical cable is a second optical cable that transmits a signal from landing station B to landing station A. In the BU, an optical coupler 301 on the apparatus is set onto the first optical cable, and an optical coupler 302 is set onto the second optical cable. Each of the optical couplers has 2×2 ports (namely, two input ports and two output ports). The first optical cable is led into an input port and out of an output port, so that the optical cable may transmit an optical service signal in a normal circumstance. The two optical couplers are connected through an optical fiber 306 capable of transmitting an optical signal. An example that the fault is detected at landing station A is taken, one end of the optical fiber 306 is connected with the first optical cable through a remaining output port of the optical coupler 301, and another end is connected with the second optical cable through a remaining input port of the optical coupler 302, so that two output ports are formed at the optical coupler 301, and two input ports are formed at the optical coupler 302. In the way, a loop for transmitting an optical signal is generated. A transmissive optical component 303 is set on the optical fiber 306, and is used to adjust an optical parameter of the optical detection signal that passes through the optical component by perceiving change of an ambient environment state parameter when a water penetration fault occurs. The transmissive optical component 303 on the optical fiber 306 may be a tapered optical fiber coated with gelatin, where the tapered optical fiber has a sub-wavelength diameter. As shown in FIG. 4, when the water penetration fault occurs, the gelatin on the tapered optical fiber adjusts its own refractive index by perceiving change of ambient environment humidity, and changes the optical parameter according to the changed refractive index when the optical detection signal passes through the optical fiber.

To help persons skilled in the art better understand the apparatus for detecting the water penetration fault of the submarine communication device described in the embodiment, the following describes the work procedure of the apparatus in detail. It should be noted that the description is exemplary, and shall not be construed as limitation on the protection scope of the present invention.

In FIG. 3, it is assumed that the water penetration fault occurs in the BU between landing station A and landing station B, and it is needed to detect water penetration for the BU between landing station A and landing station B. The onshore device at landing station A sends an optical detection signal to the BU through the first optical cable. The optical detection signal is transmitted to the optical coupler 301 through the first optical cable, and is branched and output from two ports of the optical coupler 301. The optical detection signal may be transmitted to the optical coupler 302 through a branch of the optical fiber 306. The humidity in the BU rises because water penetrates in the BU. The transmissive optical component 303 adjusts its own refractive index by perceiving the change of the ambient environment humidity. When the optical detection signal passes through the transmissive optical component 303 on the optical fiber 306, the optical power of the optical detection signal is changed correspondingly according to the change of the refractive index, and the optical detection signal is transmitted to the second optical cable from the input port of another optical coupler 302 through the optical fiber 306. The signal transmission direction of the second optical cable is opposite to that of the first optical cable. Therefore, the optical detection signal is transmitted to landing station A through the second optical cable. When receiving the optical detection signal transmitted by the second optical cable, the landing station A analyzes whether the change of the optical power of the optical detection signal exceeds the optical power loss of normal working. If an analysis result is that the optical power of the optical detection signal exceeds the normal loss, it indicates that the fault in the BU is caused by water penetration. With increase of humidity, the refractive index decreases, and the optical power also decreases.

In the embodiment, if the sent optical detection signal is a continuous optical signal, the optical power of the optical detection signal changes when the water penetrates in the BU, so that after the optical detection signal is received again, change of peak values of previous optical power and next optical power may be analyzed according to the power spectrum of light, and a conclusion that water penetrates in the BU is drawn. It should be noted that the change of the optical power of the optical detection signal is related to humidity sensitivity of a transmissive sensor.

It should be noted that in the foregoing embodiment, the example that the detection is performed at landing station A is taken. If the detection is performed at landing station B, one end of the optical fiber 306 is connected with the first optical cable through a remaining input port of the optical coupler 301, another end is connected with the second optical cable through a remaining output port of the optical coupler 302, and the optical fiber is used to transmit an optical detection signal input at landing station B. It can be seen that the apparatus provided in the embodiment can set the optical fiber connection only according to the direction of the input optical detection signal. Once the reverse direction needs to participate in the detection, the connection mode of the optical fiber 306 shall be reset. However, it is very complicated and costly to reset the connection mode of the optical fiber 306 in a submarine environment.

Figure 5:
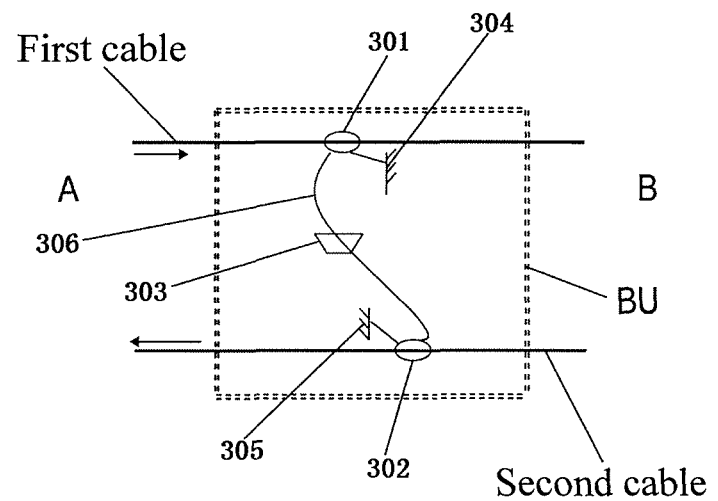
FIG. 5 is another schematic diagram of an apparatus for detecting a water penetration fault of a submarine communication device according to Embodiment 3 of the present invention.

Therefore, the embodiment of the present invention provides an optimized method on the basis. As shown in FIG. 5, in the apparatus for detecting the water penetration fault of the submarine communication device in the embodiment of the present invention, one end of the optical fiber 306 may be connected with a remaining input port of the optical coupler 301, and another end is connected with a remaining input port of the optical coupler 302. In the way, an optical reflector 304 may be installed at a remaining output port of the optical coupler 301, an optical reflector 305 may be installed at a remaining output port of the optical coupler 302. The optical reflector 304 is used to reflect, to the optical fiber, the optical detection signal transmitted on an optical cable corresponding to the optical reflector 304 and the optical reflector 305 is used to reflect, to the optical fiber, the optical detection signal transmitted on an optical cable corresponding to the optical reflector 305, so that the optical detection signal is transmitted to an optical coupler through the optical fiber along a preset loop. Therefore, when the optical detection signal is input at landing station A to the first optical cable and output to the optical reflector 304 from a branch of the optical coupler 301, the optical reflector 304 may reflect the optical detection signal to the optical fiber 306, and finally landing station A receives the optical detection signal from the second optical cable; when the optical detection signal is input at landing station B to the second optical cable and output to the optical reflector 305 from a branch of the optical coupler 302, the optical reflector 305 may reflect the optical detection signal to the optical fiber 306, and finally landing station B receives the optical detection signal from the first optical cable. Other processes are almost the same as those of the foregoing solution except that the transmission direction of the optical detection signal is reverse. In the mode, the apparatus provided in the embodiment is free from restriction of the direction of the input optical detection signal, and landing stations at any two points can initiate detection. Moreover, during the initial setting, one or two optical reflectors may be configured selectively as required, which improves flexibility of detection significantly.

Figure 6:
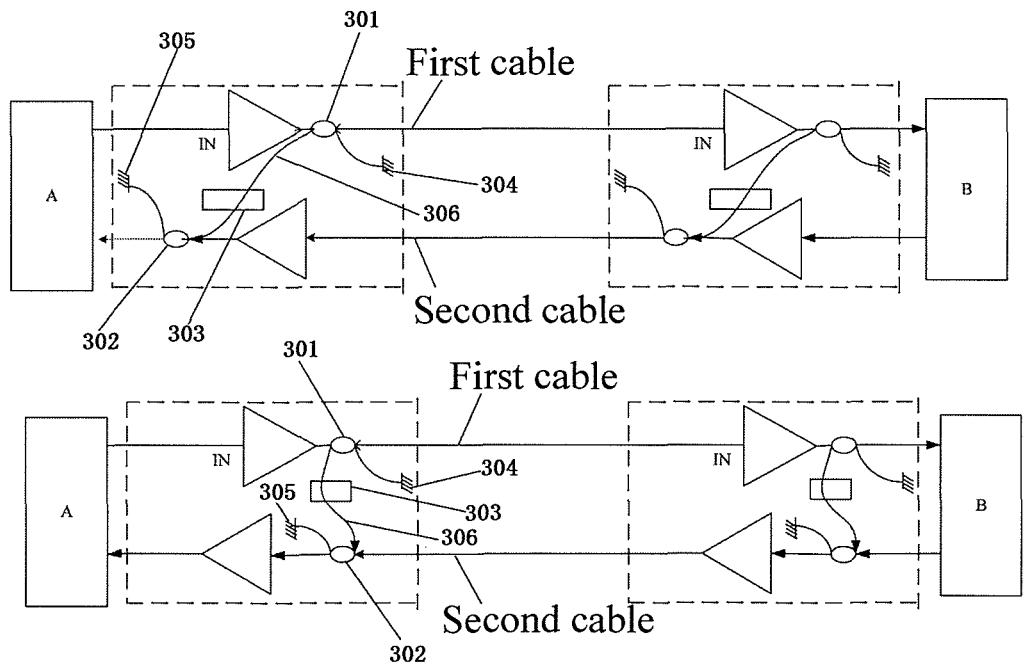
FIG. 6 is a schematic diagram of an apparatus for detecting a water penetration fault of a submarine communication device when the apparatus is set in a submarine repeater according to Embodiment 3 of the present invention.

The apparatus for detecting the water penetration fault of the submarine communication device in the embodiment may also be set in a submarine repeater. As shown in FIG. 6, FIG. 6 is a schematic diagram of the apparatus of the embodiment set in the submarine repeater. A component such as an optical signal amplifier is set in the submarine repeater, the connection of the apparatus may be set in the submarine repeater in an out-out mode or an out-in mode. For example, when the out-out mode is used for setting, an amplifier on the second optical cable is set on the end of an input port of the optical coupler 302; when the out-in mode is used for setting, the amplifier on the second optical cable is set on the end of an output port of the optical coupler 302. The flexible connection mode may be set according to an actual requirement without affecting technical effects achieved by the apparatus provided in the embodiment. The implementation mode of such connection setting is the same as that described above, and is not repeated here any further.

It should be noted that if no water penetration occurs, the optical parameter of the optical detection signal does not change. Therefore, when the onshore device judges that the optical parameter of the received optical detection signal does not change, it indicates that no water penetration fault occurs in the corresponding submarine communication device. In the embodiment, the water penetration fault is taken as an example for exemplary illustration, which shall not be construed as limitation on the protection scope of the present invention. For example, when a fault that a circuit of a submarine device burns out occurs in the submarine device, and the transmissive optical component perceives change of ambient temperature, the refractive index of the transmissive optical component changes. In the case, the transmissive optical component is an optical component sensitive to the change of the ambient temperature, and according to the optical detection signal with the changed optical parameter, it can be judged that temperature rises in the submarine communication device and the fault that the circuit burns out occurs. Therefore, the transmissive optical component not only can perceive environment state humidity, but also can perceive environment state temperature or environment state pressure, which can be set flexibly according to an application scenario.

The benefits of the embodiment lie in that: The apparatus can be set in the submarine communication device and can detect whether the water penetration fault occurs in the submarine communication device; the apparatus is applicable to different submarine communication devices, and the apparatus can perform the water penetration detection on submarine communication devices at different landing stations; the apparatus has a simple structure, and is easy to use and widely applicable in submarine communication devices.

Embodiment 4

Figure 7:
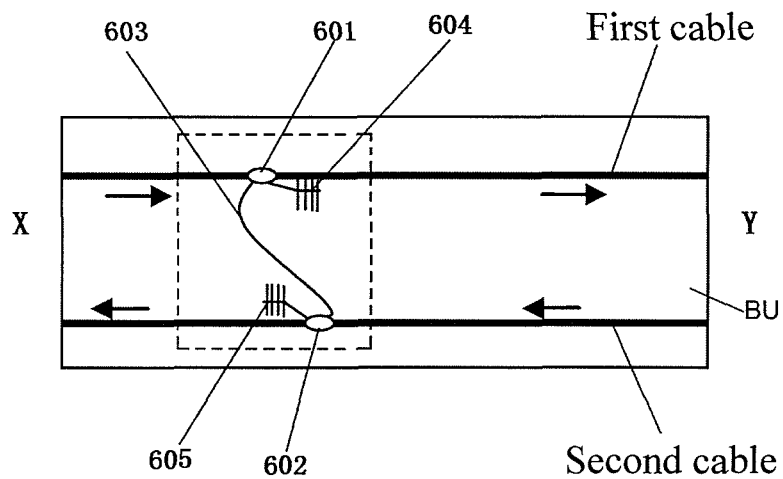
FIG. 7 is a schematic diagram of an apparatus for detecting a water penetration fault of a submarine communication device according to Embodiment 4 of the present invention.

To better implement the method in the foregoing embodiment, the embodiment provides an apparatus for detecting a water penetration fault of a submarine communication device. A submarine optical branching unit (that is, BU) used as a submarine communication device is taken as an example. As shown in FIG. 7, FIG. 7 is a schematic structure diagram of the apparatus for detecting the water penetration fault of the submarine optical branching unit.

Like FIG. 3, two unidirectional transmission submarine optical cables run through the BU as shown in FIG. 7, and are both connected to landing station X and landing station Y onshore. A transmission direction in which one of the two submarine optical cables transmits a signal is opposite to a transmission direction in which the other of the two submarine optical cables transmits a signal. That is, one optical cable is a first optical cable that transmits a signal from landing station X to landing station Y, and the other optical cable is a second optical cable that transmits a signal from landing station Y to landing station X. In the BU, an optical coupler 601 on the apparatus is set onto the first optical cable, and an optical coupler 602 is set onto the second optical cable. Each of the optical couplers has 2×2 ports (namely, two input ports and two output ports). The first optical cable is led into an input port and out of an output port, so that the optical cable may transmit an optical service signal in a normal circumstance. The two optical couplers are connected through an optical fiber 603 capable of transmitting an optical signal. One end of the optical fiber 603 is connected with a remaining input port of the optical coupler 601, and another end is connected with a remaining input port of the optical coupler 602. A reflective optical component 604 is installed at a remaining output port of the optical coupler 601, and a reflective optical component 605 is installed at a remaining output port of the optical coupler 602. The reflective optical component 604 and the reflective optical component 605 each is used to adjust an optical parameter in an optical detection signal by perceiving change of ambient environment humidity when a water penetration fault occurs, and reflect the optical detection signal with the changed optical parameter to the optical fiber, so that the optical detection signal with the changed optical parameter is transmitted to another optical coupler along the optical fiber, and transmitted to landing station X through the second optical cable. The reflective optical components (such as reflection gratings) 604 and 605 each is mainly used to adjust its own refractive index by perceiving change of an ambient environment state parameter when a fault occurs, so that the reflective optical component changes the optical parameter of the optical detection signal by changing the refractive index when the reflective optical component reflects the received optical detection signal. The reflected optical detection signal is transmitted through the optical fiber to an optical cable connected with another optical coupler, and is transmitted through the cable to the landing station that sends the optical detection signal.

To help persons skilled in the art better understand the apparatus for detecting the water penetration fault of the submarine communication device described in the embodiment, the following describes the work procedure of the apparatus in detail. It should be noted that the description is exemplary, and shall not be construed as limitation on the protection scope of the present invention.

In the example, the reflective optical component is a reflection grating sensitive to humidity, and the optical detection signal is a single-wavelength optical signal. In FIG. 7, it is assumed that a water penetration fault occurs in the BU between landing station X and landing station Y, and it is needed to detect water penetration for the BU between landing station X and landing station Y. The onshore device at landing station X sends an optical detection signal with a λ1 wavelength to the BU through the first optical cable. When the optical detection signal is transmitted through the first optical cable to the optical coupler 601 that has two output ports, and is reflected by the grating 604 on one of the output ports to the optical fiber 603. The humidity in the BU rises because water penetrates in the BU. The grating 604 adjusts its own refractive index by perceiving the change of the ambient environment humidity. When the grating 604 reflects the optical detection signal, a central wavelength of the reflection grating shifts from λ1 to λ2 due to change of the refractive index, so that the optical power of the optical detection signal reflected to the optical fiber 603 is different from the optical power of the originally received optical detection signal. The optical detection signal is transmitted through the optical fiber 603 to the second optical cable connected with the optical coupler 602. Because the signal transmission direction of the second optical cable is opposite to that of the first optical cable, the optical detection signal is transmitted through the second optical cable to landing station X. When landing station X receives the optical detection signal transmitted by the second optical cable, landing station X analyzes whether the change of the optical power of the optical detection signal exceeds the optical power loss of normal working. If the change of the power exceeds the optical power loss of normal working, it indicates that the fault of the BU is caused by water penetration. In the example, although the single-wavelength optical detection signal is taken as an example, the embodiment is also applicable to a multi-wavelength optical detection signal. In the case of the multi-wavelength optical detection signal, the principle is the same as the example. That is, optical detection signals of different wavelengths are sent to the apparatus, and the optical detection signal of each wavelength is regarded as a single-wavelength optical detection signal in the example. Through detection performed by the apparatus, the landing station receives optical detection signals of various wavelengths successively, and analyzes whether a case that the change of the optical power of the optical detection signal of a wavelength exceeds the normal change of the optical power exists so as to draw a conclusion of whether water penetrates in the submarine communication device.

The detection in the embodiment may also be performed through optical power, and the detection method is almost the same as that in Embodiment 3, so the details will not repeated herein again. In the embodiment, whether the water penetrates in the BU may also be detected through landing station Y. The main difference from the detecting water penetration at landing station X lies in that the cable for sending the optical detection signal and the cable for receiving the optical detection signal are different. When whether the water penetrates in the BU is detected at landing station Y, the optical detection signal is sent from the second optical cable and is received at the first optical cable. Other processes are the same as those in the above solutions, and only the transmission directions of the optical detection signals are reverse, so the details will not be repeated herein again. The apparatus for detecting the water penetration fault in the submarine communication device described in the embodiment may also be set in a submarine repeater. Like Embodiment 3, an out-out mode or an out-in mode may also be applied to set various flexible connections in the submarine repeater according to an actual requirement without affecting technical effects achieved by the apparatus. The implementation is the same as that in the above description, and will not be repeated herein any further.

It should be noted that, firstly, if no water penetration occurs, the optical parameter of the optical detection signal does not change, so when the onshore device judges that the optical parameter of the received optical detection signal does not change, it indicates that no water penetration fault occurs in the corresponding submarine communication device. In the embodiment, the water penetration fault is taken as an example for exemplary illustration, which shall not be construed as limitation on the protection scope of the present invention. For example, when a fault that a circuit of a submarine device burns out occurs, and the reflective optical component perceives the change of the ambient temperature, the refractive index of the reflective optical component changes. In the case, the reflective optical component is an optical component sensitive to the change of the ambient temperature, and according to the optical detection signal with the changed optical parameter, it can be judges that temperature rises in the submarine communication device and the fault that the circuit burns out occurs. Therefore, the reflective optical component not only can perceive environment state humidity, but also can perceive environment state temperature or environment state pressure, which can be set flexibly according to an application scenario.

Secondly, although two reflective optical components are taken as an example in the embodiment, according to the above embodiments and the embodiment, persons skilled in the art may understand that each reflective optical component corresponds to a landing station, that is, when detection is initiated from a landing station, only one reflective optical component corresponding to the landing station is required; and therefore, the two reflective optical components that are taken as the example in the embodiment shall not be construed as limitation on the protection scope of the present invention.

Compared with Embodiment 3, the benefits of the embodiment lie in that: No specific transmissive optical component needs to be set on the optical fiber in the embodiment; a humidity-sensitive reflective optical component can be used to change the optical parameter of the optical detection signal according to change of the ambient humidity before the optical detection signal is reflected to the optical fiber; and therefore, the whole apparatus has a simpler structure, and can also be set in various submarine communication devices for detecting water penetration in the devices, and the detection of the water penetration fault of the submarine communication device can be performed at different landing stations.

Embodiment 5

Figure 8A:
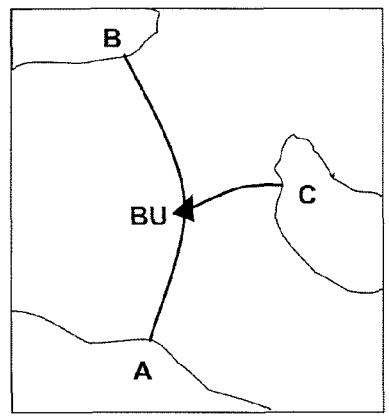
FIG. 8a is a schematic diagram of a submarine optical branching unit set at submarine according to Embodiment 5 of the present invention.
Figure 8B:
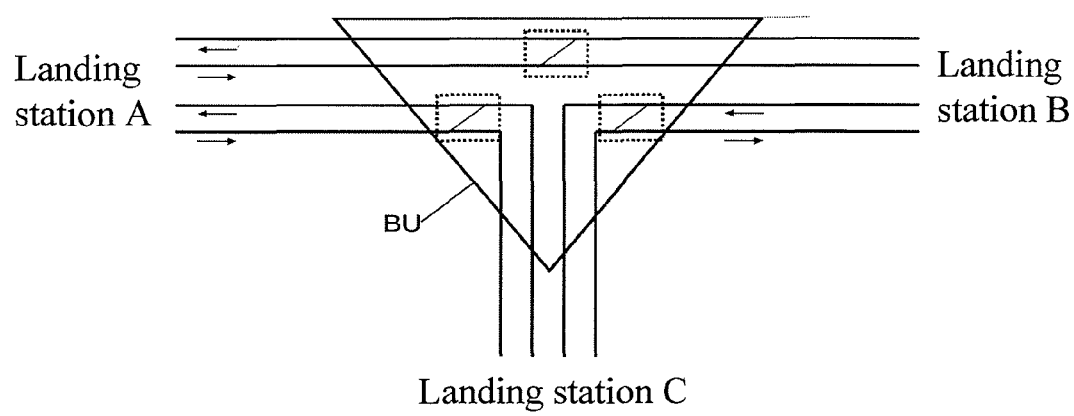
FIG. 8b is a schematic diagram of a submarine optical branching unit shown in FIG. 8a set with an apparatus for detecting a water penetration fault of a submarine communication device.

The embodiment provides a submarine optical branching unit (that is, BU) as an example, as shown in FIG. 8a and FIG. 8b. FIG. 8b shows a structure schematic diagram of a submarine optical branching unit for detecting a fault of a submarine device. The submarine optical branching unit includes three apparatuses for detecting faults of submarine devices. Each apparatus further includes:

a pair of optical couplers that are respectively set on two optical cables for transmitting optical signals in opposite direction and are configured to receive or send optical detection signals through the optical cables, where the two optical couplers are connected through an optical fiber that transmits an optical detection signal.

The two optical couplers are connected through the optical fiber that transmits the optical detection signal.

A transmissive optical component is set on the optical fiber, and is configured to adjust an optical parameter of the optical detection signal by perceiving change of an ambient environment state parameter when a fault occurs.

In practice, the BU does not correspond to one pair of cables connecting two landing stations, but corresponds to multiple pairs of cables connecting two landing stations. As shown in FIG. 8b, the BU described in the embodiment connects landing station A, landing station B, and landing station C together. An apparatus for detecting a fault of a submarine device is installed on the cable between landing station A and landing station B, and is designed to detect a fault on the cable between landing station A and landing station B in the BU. An apparatus for detecting a fault of a submarine device is installed on the cable between landing station B and landing station C, and is used to detect a fault on the cable between landing station C and landing station B in the BU. An apparatus for detecting a fault of a submarine device is installed on the cable between landing station A and landing station C, and is used to detect a fault on the cable between landing station A and landing station C in the BU. In this way, the benefit of detecting the position of the cable corresponding to each landing station in the BU, and the benefit of locating accurately two landing stations between which the cable is faulty are brought. The structure and functions of the apparatuses have been described in the preceding embodiment, and details will not be repeated herein any further.

The embodiment further provides a submarine optical branching unit (that is, BU) as an example. The submarine optical branching unit including 3 apparatuses for detecting faults of submarine devices as shown in FIG. 8b is taken as an example, and each apparatus further includes:

a pair of optical couplers that are respectively set on two optical cables for transmitting optical signals in opposite direction and are configured to receive or send optical detection signals through the optical cables, where the two optical couplers are connected through an optical fiber that transmits an optical detection signal; and a reflective optical component connected with an output port of an optical coupler and configured to adjust an optical parameter of the optical detection signal by perceiving change of an ambient environment state parameter when a fault occurs, and reflect the optical detection signal with the adjusted optical parameter to the optical fiber.

Compared the apparatus for detecting the fault of the submarine device that is firstly mentioned above in the embodiment with the apparatus for detecting the fault of the submarine device mentioned secondly, the difference lies in that: the apparatus firstly mentioned in the embodiment is implemented by using a transmissive optical component, and the apparatus mentioned secondly in the embodiment is implemented by using a reflective optical component. The structure and functions of the apparatus have been described in the preceding embodiment, and the functions of the BU are the same as those described above.

Persons skilled in the art can select and install the apparatus for detecting the fault of the submarine device according to actual conditions such as costs and test conditions, so as to achieve the objective of detecting the fault in the BU.

In conclusion, the benefits of the embodiment lie in that: The apparatus is applicable to various submarine communication devices for detecting faults in the submarine communication devices, thereby making it much convenient to locate the faults in submarine communication devices, and improving efficiency of finding out the faults in submarine communication devices. As shown in FIG. 8a and FIG. 8b, the apparatus described in the embodiment (dotted line box in FIG. 8b) may be installed between multiple cables to achieve the objective of detecting a fault in each branching unit.

The objectives, the technical solutions, and the benefits of the present invention are described above through exemplary embodiments. It should be understood that the above description is only about some exemplary embodiments of the present invention, and should not be construed as limitation to the protection scope of the present invention. Modifications, variations or equivalent replacement made without departing from the spirit and the principle of the present invention should fall within the protection scope of the present invention.

What is claimed is:

1. A method for detecting a fault of a submarine device, the method comprising:
   receiving an input optical detection signal, and transmitting the optical detection signal to an input optical detection signal side along a preset loop;
   changing, according to a change of an ambient environment state parameter, an optical parameter of the optical detection signal transmitted to the input optical detection signal side when a fault occurs, so that the input optical detection signal side judges that the fault occurs according to the change of the optical parameter of the optical detection signal, wherein changing, according to the change of the ambient environment state parameter, the optical parameter of the optical detection signal when the fault occurs comprises:
      adjusting, by a transmissive optical component used for transmitting the optical detection signal or a reflective optical component used for reflecting the optical detection signal, a refractive index of its own optical component by perceiving the change of the ambient environment state parameter, and
      changing the optical parameter of the optical detection signal according to the adjusted refractive index of the transmissive optical component or the reflective optical component.

2. An apparatus for detecting a fault of a submarine device, the apparatus comprising:
   a pair of optical couplers that are respectively set on two optical cables for transmitting optical signals in opposite direction and are configured to receive or send optical detection signals through the optical cables, wherein the two optical couplers are connected through an optical fiber that transmits an optical detection signal;
   a transmissive optical component is set on the optical fiber, and is configured to adjust an optical parameter of the optical detection signal by perceiving change of an ambient environment state parameter when a fault occurs;
   an optical reflector that is connected with an output port of an optical coupler and is configured to reflect, to the optical fiber, the optical detection signal received from the optical cable; and
   wherein the transmissive optical component that is configured to adjust the optical parameter of the optical detection signal by perceiving the change of the ambient environment state parameter when the fault occurs is further configured to adjust its own refractive index by perceiving the change of the ambient environment state parameter when the fault occurs, so that the optical parameter is changed according to the changed refractive index when the optical detection signal passes through optical media.

3. The apparatus for detecting a fault of a submarine device according to claim 2, wherein the apparatus is located in a submarine optical branching unit.

4. An apparatus for detecting a fault of a submarine device, the apparatus comprising:
   a pair of optical couplers that are respectively set on two optical cables for transmitting optical signals in opposite direction and are configured to receive or send optical detection signals through the optical cables, wherein the two optical couplers are connected through an optical fiber that transmits an optical detection signal;
   a reflective optical component connected with one output port of an optical coupler and configured to adjust an optical parameter of the optical detection signal by perceiving change of an ambient environment state parameter when a fault occurs, and reflect the optical detection signal with the adjusted optical parameter to the optical fiber; and
   wherein the reflective optical component that is configured to adjust the optical parameter of the optical detection signal by perceiving the change of the ambient environment state parameter when the fault occurs is further configured to adjust its own refractive index by perceiving the change of the ambient environment state parameter when the fault occurs, so that the optical parameter is changed according to the changed refractive index when the optical detection signal is reflected by the reflective optical component.

5. The apparatus for detecting a fault of a submarine device according to claim 4, wherein:
   the reflective optical component is a reflection grating sensitive to the change of the ambient environment state parameter.

6. The apparatus for detecting a fault of a submarine device according to claim 4, wherein the apparatus is located in a submarine optical branching unit.

* * * * *